United States Patent
Stallinga et al.

(10) Patent No.: US 7,432,485 B2
(45) Date of Patent: Oct. 7, 2008

(54) METHOD AND APPARATUS FOR DETECTION OF A SPECKLE BASED PHYSICALLY UNCLONABLE FUNCTION

(75) Inventors: Sjoerd Stallinga, Eindhoven (NL); Boris Skoric, Eindhoven (NL); Pim Theo Tuyls, Eindhoven (NL); Willem Gerard Ophey, Eindhoven (NL); Antonius Hermanus Maria Akkermans, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 18 days.

(21) Appl. No.: 10/582,383

(22) PCT Filed: Nov. 24, 2004

(86) PCT No.: PCT/IB2004/052527

§ 371 (c)(1),
(2), (4) Date: Jun. 9, 2005

(87) PCT Pub. No.: WO2005/059629

PCT Pub. Date: Jun. 30, 2005

(65) Prior Publication Data

US 2007/0090312 A1   Apr. 26, 2007

(30) Foreign Application Priority Data

Dec. 12, 2003 (EP) ................... 03104677

(51) Int. Cl.
G02B 7/04 (2006.01)
H01L 27/00 (2006.01)
(52) U.S. Cl. .................. 250/201.2; 250/208.1
(58) Field of Classification Search ............ 250/216, 250/208.1, 201.3, 208.2, 201.2, 201.4, 201.5; 359/35, 691, 683, 629, 707; 356/335–338, 356/612

See application file for complete search history.

(56) References Cited

U.S. PATENT DOCUMENTS

2003/0142379 A1* 7/2003 Takemori et al. ............. 359/35
2004/0118919 A1* 6/2004 Breytman et al. ........... 235/454

OTHER PUBLICATIONS

Creath, Katherine "Phase-Shifting Speckle Interferometry", Applied Optics, vol. 24, No. 18, Sep. 15, 1985, pp. 3053-3058, XP002316841.

(Continued)

*Primary Examiner*—Georgia Y. Epps
*Assistant Examiner*—Don Williams
(74) *Attorney, Agent, or Firm*—Michael E. Belk

(57) ABSTRACT

An optical arrangement of at least a coherent light source (1), a strongly scattering object (5) (the PUF), and a pixe-lated photo-detector (6), wherein the pixels are comparable in size with the bright and dark patches of the speckle pattern produced by coherent radiation traversing the scattering object (5). Quantitively, the pixel size should be roughly $\lambda/NA$, where $\lambda$ is the wave-length, and (i) $NA=a/z$ for free-space geometry, with a being the beam radius and z being the distance between the exit surface of the PUF (5) and the pixelated detector (6), or (ii) NA is the numerical aperture of a lens (7) in an imaging geometry. In a preferred embodiment of the invention, there are tentative requirements that the pixels should be at least smaller than $\eta_{max}\lambda NA$ and preferably larger than $\eta_{max}\lambda/NA$, where (in an exemplary embodiment) $\eta_{max}=5$ and $\eta_{min}=0.05$, say. It will be understood by a person skilled in the art that the present invention is concerned with the optical arrangement of the PUF (5) and the photo-detector (6), rather than the photo-detector (6) per se.

16 Claims, 1 Drawing Sheet

OTHER PUBLICATIONS

Ravikanth Pappu, "Physical One Way Functions", Science, vol. 297, Sep. 20, 2002, pp. 2026-2030, XP002316842.

B.L.P. Gassend, "Physical Random Functions; Thesis", Massachusetts Ins. of Technology, Feb. 2003, XP002316843.

* cited by examiner

METHOD AND APPARATUS FOR DETECTION OF A SPECKLE BASED PHYSICALLY UNCLONABLE FUNCTION

This invention relates to a method and apparatus for detection of a speckle based physically unclonable function for use in, for example, cryptographic applications.

Information security requires a mechanism that provides significant asymmetry in the effort required to make intended and unintended use of encoded information. Such protection is growing in importance as an increasing fraction of economic activity is communicated electronically; sending credit card numbers over the Internet or spending money stored in a smart card's memory assumes that this data cannot be easily duplicated.

Modem cryptographic practice rests on the use of one-way functions. These are functions that are easy to evaluate in the forward direction but infeasible to compute in the reverse direction without additional information. Although algorithmic one-way functions are widely used, they are facing a number of challenges, which can be addressed by using coherent multiple scattering from inhomogeneous structures rather than number theory to implement one-way functions.

Laser speckle fluctuations are a familiar demonstration of the sensitivity of the scattering of coherent radiation to the structure of inhomogeneous media Because any changes in the microstructure of a disordered medium cause an order unity change in its speckle pattern, a discretely sampled image of speckle intensity provides a fixed-length key that hashes the specification of the 3D spatial distribution of scatterers.

A known approach to solving the problems associated with algorithmic one-way functions is the use of physical random functions or physical unclonable functions (PUF), which are essentially random functions bound to a physical device in such a way that it is computationally and physically infeasible to predict the output of the function without actually evaluating it using the physical device.

Thus, the present invention relates to physically unclonable functions (PUF's) based on speckle patterns. In a known system, an object that scatters light strongly is illuminated with a coherent light source (e.g. a laser) of wavelength $\lambda$. The input beam with beam radius a may be modified with a spatial light modulator (SLM) which gives the beam a checkerboard light pattern of varying amplitude and/or phase. This checkerboard pattern is fully blurred when the beam has traversed the scattering structure. A pixelated detector (for example, CCD or CMOS device) is placed a distance z behind the scattering structure and records the so-called speckle pattern.

The speckle pattern consists of random bright and dark patches. The scattering structure is a physical function mapping challenges to responses. The structure is manufactured in such a way that a duplicate cannot be made, hence the unclonability. For example, the structure may comprise a layer with randomly dispersed particles of a different refractive index than the host medium. In short, the scattering structure is an embodiment of a PUF, and it will be appreciated that PUF's can be applied in cryptographic and cryptologic systems, as set out in detail by Ravikanth Pappu, et al, *Physical One-Way Functions*, Science 297, p 2026 (2002).

When the pixels of the pixelated detector are much larger than the typical size of the bright and dark patches of the speckle pattern, the intensity will average out and relevant information will be lost, resulting in deteriorated use of the PUF. On the other hand, when the pixels are much smaller than the typical size of the bright and dark patches of the speckle pattern, adjacent pixels record essentially the same information. This redundancy is not a fundamental problem, but it has the adverse effect of increasing processing requirements.

It is therefore an object of the present invention to provide an optical method and apparatus in which criteria are employed to determine the size of the pixels of the detector that will give rise to detection of all relevant bits (i.e. the pixels are small enough) without too much redundancy (i.e. the pixels are large enough).

SUMMARY OF THE INVENTION

Thus, in accordance with the present invention, there is provided optical apparatus comprising an optical system for providing a coherent radiation source, a strongly scattering object located in the path of said coherent radiation, and a pixelated photo-detector for detecting a speckle pattern incident thereon, said speckle pattern being produced by said said coherent radiation being incident on said strongly scattering object, wherein the size of the pixels of said photo-detector is determined by the location thereof in said optical apparatus relative to said strongly scattering object and is set at substantially the same size as that of bright and dark patches present in said speckle pattern as determined by $\lambda$/NA, where $\lambda$ is the wavelength of said coherent radiation, and NA is the numerical aperture of said optical system.

Also in accordance with the present invention, there is provided a method of detecting a speckle pattern, comprising irradiating a strongly scattering object with coherent radiation and providing a pixelated photo-detector for receiving the resultant speckle pattern, wherein the size of the pixels of said photo-detector is determined by the location thereof relative to said strongly scattering object and is set at substantially the same size as that of bright and dark patches present in said speckle pattern as determined by $\lambda$/NA, where $\lambda$ is the wavelength of said coherent radiation, and NA is the numerical aperture of said optical system.

In one exemplary embodiment of the present invention, the optical system comprises a coherent radiation source for providing a coherent radiation beam of radius a, the photo-detector being located a distance z from said strongly scattering object, wherein NA=a/z. In an alternative exemplary embodiment of the present invention, the optical system may comprise a coherent radiation source for providing a coherent radiation beam having a radius a, and one or more converging optical elements having a focal length f, such as a lens or the like, in the path of the coherent radiation beam between the strongly scattering object and the photo-detector, wherein NA=a/f In this case, the one or more optical elements are located a distance v from the strongly scattering object and a distance b from the photo-detector, wherein 1/v+1/b=1/f.

In both cases, a spatial light modulator may be provided between the strongly scattering object and the coherent radiation source. One or more elements with optical power (that is to say the ability to refract light), such as a lens or the like, may also be provided in the radiation path between the strongly scattering object and the coherent radiation source. Preferably, the formation of a speckle pattern by the strongly scattering object is an implementation of a physically unclonable function.

Beneficially, the pixels of the photo-detector are at least smaller than $\eta_{max}\lambda$/NA, where $\eta_{max}$ is a number in the range 1 to 20, more preferably 1 to 10, and even more preferably 5 to 10. In one specific embodiment of the invention, $\eta_{min}$ may be 5. Similarly, the pixels of the photo-detector are preferably larger than $\eta_{min}\lambda$/NA, where $\eta_{min}$ is a number between 0 and 2, more preferably between 0 and 1, and even more preferably between 0.05 and 0.5. In one specific embodiment of the present invention, $\eta_{min}$ may be 0.05.

BRIEF DESCRIPTION OF THE DRAWINGS

These and other aspects of the present invention will be apparent from, and elucidated with reference to, the embodiments described herein.

Embodiments of the present invention will now be described by way of examples only and with reference to the accompanying drawings, in which.

DETAILED DESCRIPTION OF THE DRAWINGS

Thus, as stated above, it is an object of the present invention to provide an optical method and apparatus in which criteria are employed to determine the size of the pixels of the detector that will give rise to detection of all relevant bits (i.e. the pixels are small enough) without too much redundancy (i.e. the pixels are large enough). In practice, however, the size of the pixels may be fixed, and it is the distance between the PUF and the detector which is varied in order to match pixel size to speckle patch size.

Thus, the present invention has as its aim to make the pixels comparable in size to the bright and dark patches of the speckle pattern. The typical size of these patches has been found to be $\lambda z/a$, provided that a is much smaller than z, which is likely to be the case, in practice.

The maximum size of the pixels may be estimated using the sampling theorem of band-limited functions. If z is sufficiently large, the field at the detector plane is the Fourier-transform of the field at the exit surface of the PUF. This regime is known as the far-field or Fraunhofer diffraction regime. In that case, the highest spatial frequency of the field at the detector turns out to be $a/\lambda z$. According to the Nyquist criterion, it is then necessary to sample the signal with at least twice this spatial frequency bandwidth, which implies that the pixels should be spaced at a distance $\lambda z/2a$ or less. In practice, pixels have a finite size and thus do not measure the intensity at a point but instead measure the average intensity over the pixel area The effect of averaging over the pixel area may be estimated from the probability distribution of the intensity. According to J. W. Goodman, *Statistical Properties of Laser Speckle* Patterns (in *Laser Speckle and Related* Phenomena, J. C. Dainty ed., Springer-Verlag, 1975), the probability density to measure a normalised intensity $x=I/I_0$, where I is the intensity and $I_0$ the average intensity is given by:

$$P(x) = \frac{M}{\Gamma(M)}(Mx)^{M-1}\exp[-Mx]$$

Where M is approximately related to the pixel area $S_m$ by:

$$M \approx 1 + \frac{S_m}{S_c}$$

Where $S_c \approx (\lambda z/a)^2$, the typical area of a speckle patch. Furthermore, $\Gamma(M)$ is the so-called gamma-function, defined by:

$$\Gamma(M) = \int_0^\infty dt\, t^{M-1}\exp[-t].$$

Figure 2:
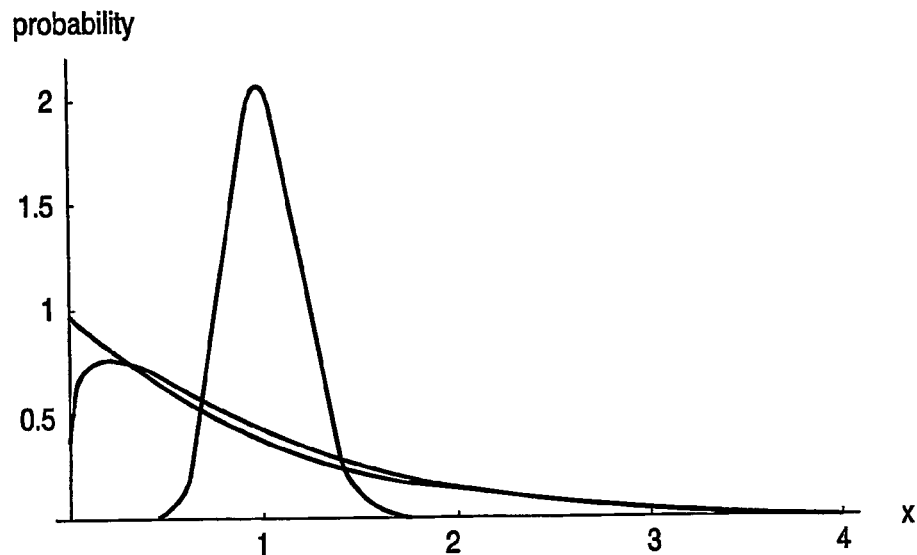
FIG. 2 is a graphical representation of the normalised intensity probability distribution in respect of the apparatus of FIG. 1.

The probability function is illustrated in FIG. 2 of the drawings for M=1.0025 (the exponentially decaying function), M=26 (the peaked function), and M=1.25 (the intermediate, nearly exponentially decaying function). These cases correspond to pixel size of 1/10, 10 and 1 times the Nyquist sampling frequency, respectively. Clearly, for small pixel areas, the distribution is relatively smooth, whereas for large pixel areas it is more peaked around the average value, approaching a Gaussian distribution in the limit of very large pixel area values.

As shown, therefore, the intensity probability distribution is a relatively smooth distribution for small pixel area values and a sharply peaked distribution for large pixel area values. As the measurement of intensity is always noisy, it follows that there must be an upper limit for M above which the width of the peaked distribution is indistinguishable from the noise. Clearly, in order to extract all useful bits, it is necessary to stay well below this upper limit.

As an example, $5\lambda z/a$ may be taken as a tentative upper limit for the pixel size. The lower limit below which a decrease in pixel size no longer increases the amount of useful bits follows from the value for M below which the probability distribution hardly deviates from the value in the limiting case M=1. In one exemplary embodiment, $0.05\lambda z/a$ may be taken as a tentative lower limit for the pixel size.

Figure 1:
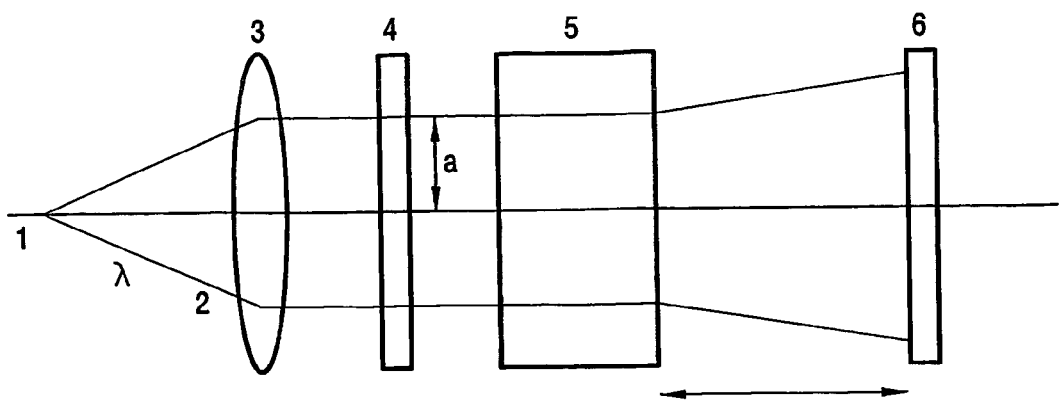
FIG. 1 is a schematic diagram illustrating optical apparatus according to a first exemplary embodiment of the present invention.

Referring to FIG. 1 of the drawings, an optical arrangement according to a first exemplary embodiment of the present invention is illustrated, which arrangement is referred to herein as 'free space geometry'. An alternative embodiment is referred to herein as 'imaging geometry', in which the exit surface of the PUF and the detector are in conjugate planes of a lens, or more generally, an optical system. In the free space geometry of FIG. 1, it is possible to define NA=a/z, thereby making the speckle patch size $\lambda/NA$. The arrangement comprises a source 1 emitting a coherent light beam 2 of wavelength $\lambda$, a lens 3 converging the beam 2 to a beam of radius a, an SLM 4 imposing a checkerboard pattern on the beam, a PUF 5, and a pixelated detector 6 placed a distance z behind the PUF.

Figure 3:
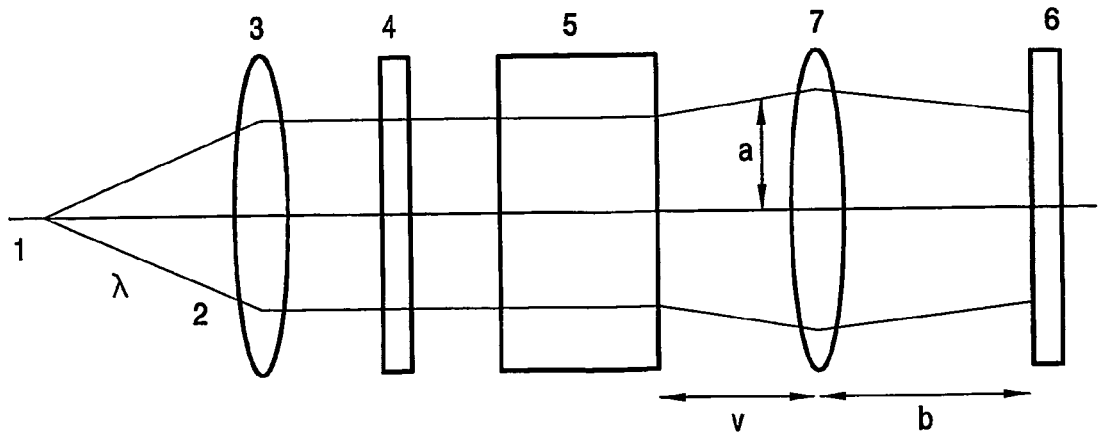
FIG. 3 is a schematic diagram illustrating optical apparatus according to a second exemplary embodiment of the present invention.

Referring to FIG. 3 of the drawings, an alternative exemplary embodiment of the present invention is further supplemented with an additional lens 7 with focal length f, placed a distance v behind the exit surface of the PUF and a distance b in front of the detector, where $1/v+1/b=1/f$ i.e. the detector is placed in the image plane of the exit surface of the PUF. As explained above, in this exemplary embodiment of the present invention, the exit surface and the detector are in conjugate planes of a lens 7, or more generally, an optical system. Conjugate planes means that the two planes are the object and the image planes of each other. The typical size of the patches in the speckle pattern is once again $\lambda/NA$, where the numerical aperture is defined as NA=a/f where a is the beam radius at the lens and f is the focal length of the lens (provided that a is much smaller than f, i.e. it holds only for small NA values).

Other exemplary embodiments of the invention, for example, with an optical imaging system preceding the PUF, are also conceivable.

Thus, in summary, the present invention provides an optical arrangement of at least a coherent light source, a strongly scattering object (the PUF), and a pixelated photo-detector, wherein the pixels are comparable in size with the bright and dark patches of the speckle pattern. Quantitatively, as explained above, the pixel size should be roughly $\lambda/NA$, where $\lambda$ is the wavelength, and (i) $NA=a/z$ for the free-space geometry described above, with a being the beam radius and z being the distance between the exit surface of the PUF and the pixelated detector, or (ii) NA is the numerical aperture of the lens 7 in the imaging geometry described above. In a preferred embodiment of the invention, there are tentative requirements that the pixels should be at least smaller than $\eta_{max}\lambda/NA$ and preferably larger than $\eta_{min}\lambda/NA$, where $\eta_{max}=5$ and $\eta_{min}=0.05$. It will be understood by a person skilled in the art that the present invention is concerned with the optical arrangement of the PUF and the photo-detector, rather than the photo-detector per se.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. Optical apparatus comprising an optical system (6, 7) for providing a coherent radiation beam (2), a strongly scattering object (5) located in the path of said coherent radiation, and a pixelated photo-detector (6) for detecting a speckle pattern incident thereon, said speckle pattern being produced by said coherent radiation being incident on said strongly scattering object (5), wherein the size of the pixels of said photo-detector (6) is determined by the location thereof in said optical apparatus relative to said strongly scattering object (5) and is set at substantially the same size as that of bright and dark patches present in said speckle pattern as determined by $\lambda/NA$, where $\lambda$ is the wavelength of said coherent radiation, and NA is the numerical aperture of said optical system (6, 7).

2. Optical apparatus according to claim 1, wherein the optical system comprises a coherent radiation source (1) for providing a coherent radiation beam (2) of radius a, said photo-detector (6) being located a distance z from said strongly scattering object (5), wherein $NA=a/z$.

3. Optical apparatus according to claim 1, wherein the optical system comprises a coherent radiation source (1) for providing a coherent radiation beam (2) of radius a, and one or more converging optical elements (7) having a focal length f, in the path of the coherent radiation beam (2) between said strongly scattering object (5) and said photo-detector (6), wherein $NA=a/f$.

4. Optical apparatus according to claim 3, wherein the one or more optical elements (7) are located a distance v from the strongly scattering object (5) and a distance b from the photo-detector (6), wherein $1/v+1/b=1/f$.

5. Optical apparatus according to claim 1, wherein a spatial light modulator (4) is provided between the coherent radiation source (1) and the strongly scattering object (5).

6. Optical apparatus according to claim 1, wherein one or more elements (3) with optical power is provided in the radiation path between the coherent radiation source (1) and the strongly scattering object (5).

7. Optical apparatus according to claim 1, wherein the formation of a speckle pattern by said strongly scattering object is an implementation of a physically unclonable function.

8. Optical apparatus according to claim 1, wherein the photo-detector (6) and the strongly scattering object (5) are located relative to each other such that the pixels of the photo-detector (6) are at least smaller than $\eta max\lambda/NA$, where $\eta max$ is a number in the range 1 to 20.

9. Optical apparatus according to claim 8, wherein $\eta max$ is a number in the range 1 to 10.

10. Optical apparatus according to claim 9, wherein $\eta max$ is a number in the range 5 to 10.

11. Optical apparatus according to claim 10, wherein $\eta max=5$.

12. Optical apparatus according to claim 1, wherein the photo-detector (6) and the strongly scattering object (5) are located relative to each other such that the pixels of the photo-detector (6) are larger than $\eta min\lambda/NA$, where $\eta min$ is a number between 0 and 2.

13. Optical apparatus according to claim 12, wherein $\eta min$ is a number between 0 and 1.

14. Optical apparatus according to claim 13, wherein $\eta min$ is a number in the range 0.05 and 0.5.

15. Optical apparatus according to claim 14, wherein $\eta min=0.05$.

16. A method of detecting a speckle pattern, comprising irradiating a strongly scattering object (5) with coherent radiation and providing a pixelated photo-detector (6) for receiving the resultant speckle pattern, wherein the size of the pixels of said photo-detector (6) is determined by the location thereof relative to said strongly scattering object (5) and is set at substantially the same size as that of bright and dark patches present in said speckle pattern as determined by $\lambda/NA$, where $\lambda$ is the wavelength of said coherent radiation, and NA is the numerical aperture of said optical system.

* * * * *